(12) United States Patent
Sumiyama et al.

(10) Patent No.: US 9,755,226 B2
(45) Date of Patent: Sep. 5, 2017

(54) NICKEL-HYDROGEN STORAGE BATTERY AND BATTERY PACK

(71) Applicant: PANASONIC CORPORATION, Osaka (JP)

(72) Inventors: Shinichi Sumiyama, Osaka (JP); Yasushi Nakamura, Osaka (JP); Akiko Okabe, Osaka (JP); Fumio Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 375 days.

(21) Appl. No.: 14/437,092

(22) PCT Filed: Oct. 7, 2013

(86) PCT No.: PCT/JP2013/005960
§ 371 (c)(1),
(2) Date: Apr. 20, 2015

(87) PCT Pub. No.: WO2014/083741
PCT Pub. Date: Jun. 5, 2014

(65) Prior Publication Data
US 2015/0280216 A1  Oct. 1, 2015

(30) Foreign Application Priority Data

Nov. 28, 2012 (JP) ................................. 2012-259598

(51) Int. Cl.
*H01M 2/14* (2006.01)
*H01M 2/16* (2006.01)
(Continued)

(52) U.S. Cl.
CPC ............. *H01M 4/242* (2013.01); *H01M 2/14* (2013.01); *H01M 2/162* (2013.01);
(Continued)

(58) Field of Classification Search
None
See application file for complete search history.

(56) References Cited

U.S. PATENT DOCUMENTS 5,034,289 A * 7/1991 Yuasa ................... H01M 4/242
429/206
5,250,369 A  10/1993 Yuasa et al.
(Continued)

FOREIGN PATENT DOCUMENTS

EP  0386305 A1  9/1990
EP  0821423 A1  1/1998
(Continued)

OTHER PUBLICATIONS

International Search Report issued in PCT/JP2013/005960, dated Jan. 14, 2014, with English translation.

*Primary Examiner* — Scott J Chmielecki
(74) *Attorney, Agent, or Firm* — McDermott Will & Emery LLP

(57) ABSTRACT

There is provided a nickel-metal hydride storage battery with suppression of rise in internal pressure, allowing suppression of alkaline electrolyte leakage even when two or more of the batteries are used. The battery includes: positive and negative electrodes; a separator interposed therebetween; and an alkaline electrolyte. The negative electrode includes: a material mixture layer including hydrogen storage alloy powder capable of electrochemically absorbing and releasing hydrogen; and a water-repellent layer including a first polymer including tetrafluoroethylene as monomer units, formed on the material mixture layer. The separator includes: a primary layer having a non-woven fabric structure of fibers; and a composite layer formed on the primary layer and being in contact with the water-repellent layer. The composite layer includes: fibers in continuity with the non-woven fabric structure; and a second polymer including (Continued)

tetrafluoroethylene as monomer units. The composite layer has a water contact angle of 10 to 80°.

13 Claims, 2 Drawing Sheets

(51) Int. Cl.
    *H01M 4/24*     (2006.01)
    *H01M 4/36*     (2006.01)
    *H01M 10/34*     (2006.01)
    *H01M 4/62*     (2006.01)
    *H01M 4/02*     (2006.01)

(52) U.S. Cl.
    CPC ....... *H01M 2/1606* (2013.01); *H01M 2/1686* (2013.01); *H01M 4/366* (2013.01); *H01M 4/622* (2013.01); *H01M 10/34* (2013.01); *H01M 4/623* (2013.01); *H01M 2004/027* (2013.01); *H01M 2300/0014* (2013.01)

(56) References Cited

U.S. PATENT DOCUMENTS

| | | | |
|---|---|---|---|
| 5,346,781 | A | 9/1994 | Yuasa et al. |
| 6,156,453 | A | 12/2000 | Shimizu et al. |
| 2003/0138701 | A1* | 7/2003 | Tsukiashi .............. H01M 2/162 429/250 |
| 2009/0061317 | A1 | 3/2009 | Tanaka et al. |

FOREIGN PATENT DOCUMENTS

| | | |
|---|---|---|
| JP | 02-291665 A | 12/1990 |
| JP | 05-121061 A | 5/1993 |
| JP | 05-242908 A | 9/1993 |
| JP | 06-181068 A | 6/1994 |
| JP | 08-031413 A | 2/1996 |
| JP | 08-185854 A | 7/1996 |
| JP | 08-339809 A | 12/1996 |
| JP | 09-073897 A | 3/1997 |
| JP | 2009-076430 A | 4/2009 |
| JP | 2009-081040 A | 4/2009 |
| WO | 96-32751 A1 | 10/1996 |

* cited by examiner

NICKEL-HYDROGEN STORAGE BATTERY AND BATTERY PACK

RELATED APPLICATIONS

This application is the U.S. National Phase under 35 U.S.C. §371 of International Application No. PCT/JP2013/005960, filed on Oct. 7, 2013, which in turn claims the benefit of Japanese Application No. 2012-259598, filed on Nov. 28, 2012, the disclosures of which Applications are incorporated by reference herein.

TECHNICAL FIELD

The present invention relates to a nickel-metal hydride storage battery and a battery assembly using the same, and particularly relates to an improvement of a separator in a nickel-metal hydride storage battery.

BACKGROUND ART

Nickel-metal hydride storage batteries which use a negative electrode including a hydrogen storage alloy as a negative electrode active material has excellent output characteristics and high durability. Therefore, nickel-metal hydride storage batteries are expected to be used as a driving power source for electric vehicles, for example. Moreover, nickel-metal hydride storage batteries are capable of repeated use; and from increased awareness of environmental issues in recent years, they are attracting attention due to being capable of reducing environmental burden if used as an alternative to dry batteries.

For a nickel-metal hydride storage battery, an electrode assembly including a positive electrode, a negative electrode, and a separator interposed therebetween is housed in a metallic battery case (outer packaging can), together with an alkaline electrolyte. For a positive electrode active material, a nickel oxide such as nickel oxyhydroxide or nickel hydroxide is mainly used. The hydrogen storage alloy serving as the negative electrode active material is capable of reversibly absorbing and releasing hydrogen.

For the hydrogen storage alloy, that having a $CaCu_5$-type crystal structure is mainly used. When high capacity is required of the hydrogen storage alloy, that including a $Ce_2Ni_7$-type or $CeNi_3$-type crystal structure is used. In order to improve the battery characteristics of a nickel-metal hydride storage battery, attempts are being made to optimize the performance of the hydrogen storage alloy in powder form.

For example, Patent Literature 1 discloses use of a hydrogen storage alloy including a rare earth element, Mg, and Ni of which the equilibrium hydrogen pressure is increased, thereby to allow the operating voltage of a nickel-metal hydride storage battery using such alloy to increase, so that such battery can operate in a device designed for a battery operating voltage of 1.5 V to correspond with a dry battery.

In a nickel-metal hydride storage battery, if the negative electrode capacity is smaller than the positive electrode capacity, large amounts of hydrogen would be generated at the negative electrode during overcharge. Therefore, the negative electrode capacity is usually made larger than the positive electrode capacity, and by doing so, generation of hydrogen gas at the negative electrode during overcharge can be reduced. When the positive electrode capacity is smaller than the negative electrode capacity, the positive electrode active material that should react with hydroxide ions becomes completely consumed during overcharge; and the resultant oxidation of the hydroxide ions causes oxygen gas to be generated at the positive electrode.

However, since the negative electrode capacity is large (i.e., metal hydride that is active in a charge reaction is included in the hydrogen storage alloy, in large amounts), the negative electrode can absorb oxygen gas generated at the positive electrode and convert it to water. Specifically, at the negative electrode, the oxygen gas reacts with the metal hydride included in the hydrogen storage alloy and is converted to water. As such, in a nickel-metal hydride storage battery, the negative electrode capacity is made larger than the positive electrode capacity for the negative electrode to suppress generation of hydrogen gas during overcharge and to absorb oxygen gas, thereby to suppress rise in the internal pressure of the battery and allow hermeticity of the battery.

On the other hand, since the positive electrode capacity is smaller than the negative electrode capacity, at the positive electrode, during overdischarge, nickel oxyhydroxide that should react with water becomes completely consumed and the resultant reduction of water causes generation of hydrogen gas. The hydrogen gas generated at the positive electrode reaches the negative electrode by diffusion, is then absorbed into the hydrogen storage alloy. Specifically, at the negative electrode, the hydrogen gas is oxidized due to a reaction with the hydrogen storage alloy and is converted to water. As such, in a nickel-metal hydride storage battery, hydrogen gas generated at the positive electrode is absorbed into the negative electrode, thereby to suppress rise in the internal pressure of the battery during overdischarge.

Patent Literature 2 discloses providing a water-repellent resin on the surface of a negative electrode formed of a hydrogen storage alloy, as a technique to improve oxygen gas absorption and hydrogen gas absorption. Patent Literature 3 also proposes applying a dispersion including a water repellent agent to the surface of a separator using rollers, in order to prevent separation of the water repellent agent from the negative electrode surface.

PRIOR ART

Patent Literature

[Patent Literature 1] Japanese Laid-Open Patent Publication No. 2009-81040
[Patent Literature 2] Japanese Laid-Open Patent Publication No. Hei 2-291665
[Patent Literature 3] Japanese Laid-Open Patent Publication No. Hei 5-121061

SUMMARY OF INVENTION

Technical Problem

In Patent Literature 1, the hydrogen storage alloy includes a rare earth element, Mg, and Ni, and is therefore favorable in increasing the battery capacity. The hydrogen storage alloy also has a high equilibrium hydrogen pressure, and therefore, even when the nickel-metal hydride storage battery including such alloy is used as an alternative to a dry battery with an operating voltage of about 1.5 V, the operability of the device does not degrade to a large extent. However, the high equilibrium hydrogen pressure also causes reduction in hydrogen gas absorption at the negative electrode.

When increasing the capacity of a nickel-metal hydride storage battery, the positive electrode capacity originally set to be small, needs to be enlarged. However, since the internal volume of the battery cannot be changed much, the negative electrode capacity needs to be small in order to enlarge the positive electrode capacity. When the negative electrode capacity is made small, the mass of the hydrogen storage alloy becomes small, resulting in reduction in oxygen gas absorption and hydrogen gas absorption.

In order to increase the capacity of a nickel-metal hydride storage battery, the space inside the battery needs to be filled with the positive electrode active material and the negative electrode active material as much as possible, so that the volume of any remaining space would be small. When the volume of the remaining space inside the battery becomes small, the internal pressure of the battery tends to become large. Particularly, when a hydrogen storage alloy containing a rare earth element, Mg, and Ni is used and/or the positive electrode capacity is made larger to increase the battery capacity, and the volume of the remaining space is small, there would be a rapid rise in the internal pressure of the battery.

Theoretically, in a nickel-metal hydride storage battery, oxygen gas is generated during overcharge and hydrogen gas is generated during overdischarge. A nickel-metal hydride storage battery is typically charged with a dedicated charger. The dedicated charger is designed to control the battery via voltage, temperature, and other factors, thereby to prevent the battery from becoming overcharged. Therefore, during charge, oxygen gas is limitedly generated at the last stage of charge. However, in contrast to controlling the battery to prevent overcharge, controlling the battery to prevent overdischarge is difficult.

Absorption of hydrogen gas (oxidation reaction of hydrogen gas) at the negative electrode proceeds at a three-phase boundary of the vapor phase (gas), the liquid phase (alkaline electrolyte), and the solid phase (hydrogen storage alloy), i.e., where a boundary surface is formed between a portion of the hydrogen storage alloy surface with an alkaline electrolyte layer formed thereon and a portion thereof without such layer formed thereon. Absorption of oxygen gas (reduction reaction of oxygen gas) at the negative electrode is a vapor phase reaction also, and therefore proceeds at the three-phase boundary on the negative electrode as with the oxidation reaction of hydrogen gas.

Therefore, formability of such three-phase boundary on the negative electrode affects gas absorption by the negative electrode. Presumably, as in Patent Literature 2, when water repellency is imparted to the surface of the negative electrode, the three-phase boundary tends to be formed on the negative electrode. However, by a technique as in Patent Literature 2, it would actually be difficult to sufficiently secure the three-phase boundary after the battery is assembled, since the water repellent agent tends to separate from the negative electrode surface during the production process of the battery. Therefore, by the technique in Patent Literature 2, although gas absorption can be increased to a certain extent, hydrogen gas that is generated with every repeated charge and discharge and accumulates inside the battery would not be sufficiently absorbed.

In a nickel-metal hydride storage battery, an aqueous alkaline solution is used as the electrolyte, and hydroxide ions in the alkaline electrolyte become involved in charge and discharge reactions. Therefore, the separator interposed between the positive electrode and the negative electrode is required to have high wettability by the alkaline electrolyte. In fact, a separator for nickel-metal hydride storage batteries is subjected to a hydrophilization treatment such as a plasma treatment or a sulfuric acid treatment, in order to impart hydrophilicity to a non-woven fabric of polyolefin such as polypropylene (PP) that is originally hydrophobic. If a water repellent agent is applied in large amounts to such hydrophilized separator as in Patent Literature 3, hydrophilicity of the separator would degrade and efficiency of a battery reaction would tend to become lower.

A nickel-metal hydride storage battery is expected to serve as an alternative to a dry battery. Regarding a dry battery, since voltage is not that large per battery, in most instances, a battery assembly including two or more batteries connected in series is set in a device.

When a nickel-metal hydride storage battery is used as a battery assembly including two or more batteries connected in series as with a dry battery, if the remaining capacities of the two or more batteries vary, the battery with the smaller remaining capacity would undergo a polarity reversal; and such battery with reversed polarity would be charged by another battery. Therefore, generation of hydrogen gas and oxygen gas would be prominent in such battery with reversed polarity, resulting in rise in the internal pressure of the battery. With rise in the internal pressure of the battery, gas is released from the gas release hole; and repetition of such rise and release tends to cause leakage of the alkaline electrolyte.

Next, with reference to FIGS. 2 to 4, a description will be given of a mechanism of polarity reversal in some batteries included in a battery assembly of nickel-metal hydride storage batteries.

FIG. 2 is a graph showing transitions of closed circuit voltages of four AA nickel-metal hydride storage batteries A to D in a charged state, when a battery assembly including the four batteries connected in series is connected to a resistance of 16Ω and discharged at 20±1° C. for 20 hours. FIG. 3 is a graph showing transitions of closed circuit voltages of three AA nickel-metal hydride storage batteries A to C in a charged state and one AA nickel-metal hydride storage battery in a discharged state, when a battery assembly including the four batteries connected in series is connected to a resistance of 16Ω and discharged at 20±1° C. for 20 hours. FIG. 4 is a graph showing transitions of batteries, when a battery assembly similar to that of FIG. 3 and a resistance of 8.2Ω are used for conducting discharge in the same manner as for FIG. 3.

In FIGS. 2 to 4, the batteries A to D in a charged state that were used, were batteries discharged at a discharge current of 0.2 C with respect to battery capacity, until an end-of-discharge voltage of 0.9 V and then charged at a charge current of 0.1 C for 16 hours. In FIGS. 3 and 4, the batteries in a discharged state (discharged batteries) that were used, were batteries discharged at a discharge current of 0.2 C with respect to battery capacity, until an end-of-discharge voltage of 0.9 V.

As shown in FIG. 2, around 6.5 hours after start of discharge, the batteries exhibited rapid drops in voltage, among which the batteries with relatively small capacities (batteries C and D) underwent a polarity reversal. In the batteries with reversed polarities, hydrogen gas was generated. The resultant hydrogen gas reacted with a hydrogen storage alloy M according to formula (1) below in the negative electrode, and was thus absorbed into the negative electrode.

$$2M+H_2 \rightarrow 2MH \tag{1}$$

When one among the four batteries was connected in a discharged state, as shown in FIG. 3, the discharged battery underwent a polarity reversal immediately after start of discharge of the battery assembly and exhibited a constant voltage of about −0.3 V. Thereafter, the three charged batteries A to C exhibited rapid drops in voltage, while the discharged battery started to rise in voltage.

Even when the resistance connected to the battery assembly was 8.2Ω and thus smaller than that for FIG. 3, as shown in FIG. 4, the discharged battery underwent a polarity reversal immediately after start of discharge and exhibited a constant voltage of about −0.3 V for two hours after start of discharge. However, after two hours from start of discharge, the discharged battery exhibited a further drop in voltage, and a constant voltage of about −1.8 V for about six hours after start of discharge. In contrast, the charged batteries A to C exhibited drops in voltages after six hours from start of discharge, and at this point in time, the discharged battery started to rise in voltage.

As above, when two or more nickel-metal hydride storage batteries are connected together and the resultant battery assembly is connected to a device (resistance), if there is a battery with a small remaining capacity among the batteries, a greater load would be applied to that battery by a battery with a larger remaining capacity. This would cause the battery with the small remaining capacity to undergo a polarity reversal, followed by charge, and hydrogen gas would be generated at the positive electrode.

When the battery with a small remaining capacity is connected to a small load resistance, hydrogen gas that exceeds the gas absorbability of the negative electrode is generated. Moreover, since the battery becomes overdischarged, oxygen gas is also generated at the positive electrode. As such, in the battery with a small remaining capacity, since gas is generated in large amounts, the internal pressure of the battery rises significantly. When the internal pressure of the battery exceeds a predetermined value, gas is released from the gas release hole in the battery, thereby allowing the internal pressure to drop. However, if gas is generated in large amounts, gas would be continuously or repeatedly released from the gas release hole, and such instances would cause leakage of the alkaline electrolyte.

A nickel-metal hydride storage battery can be charged and discharged repeatedly. Therefore, compared to a dry battery, a nickel-metal hydride storage battery is more likely to be used in the manner of connecting two or more batteries with different states of charge. Moreover, when the resistance connected to the batteries is of a large value, polarity reversal is unlikely to occur, thereby causing difficulty in observing leakage of the alkaline electrolyte. Therefore, even when leakage of the alkaline electrolyte is not observed in an evaluation using only one battery and/or a large resistance, if the method used for the evaluation is based on the actual use of nickel-metal hydride storage batteries (i.e., in actual use, two or more batteries would be connected to a small resistance), any possible leakage may be left unsuppressed.

Solution to Problem

An object of the present invention is to provide a nickel-metal hydride storage battery with suppression of rise in the internal pressure of the battery, capable of suppressing leakage of an alkaline electrolyte even when two or more of the batteries are used.

One aspect of the present invention relates to a nickel-metal hydride storage battery including:
a positive electrode;
a negative electrode;
a separator interposed between the positive electrode and the negative electrode; and
an alkaline electrolyte,
the negative electrode including:
a negative electrode material mixture layer including powder of a hydrogen storage alloy capable of electrochemically absorbing and releasing hydrogen; and
a water-repellent layer including a first polymer including tetrafluoroethylene as monomer units, formed on the surface of the negative electrode material mixture layer,
the separator including:
a primary layer having a non-woven fabric structure of fibers; and
a composite layer formed on the surface of the primary layer and being in contact with the water-repellent layer,
the composite layer including:
fibers in continuity with the non-woven fabric structure; and
a second polymer including tetrafluoroethylene as monomer units; and
the surface of the composite layer having a contact angle with water of 10 to 80°.

Another aspect of the present invention relates to a battery assembly including two or more of the foregoing batteries connected in series.

Advantageous Effect of Invention

According to the present invention, absorption of hydrogen gas and oxygen gas at the negative electrode can be facilitated. Moreover, even when two or more batteries are used, voltage drops in some of the batteries can be suppressed. Therefore, rise in the internal pressure of the battery and leakage of the alkaline electrolyte can both be suppressed.

While the novel features of the present invention are set forth particularly in the appended claims, the present invention, both as to organization and content, will be better understood and appreciated, along with other objects and features thereof, from the following detailed description taken in conjunction with the drawings.

DESCRIPTION OF EMBODIMENTS

Figure 1:
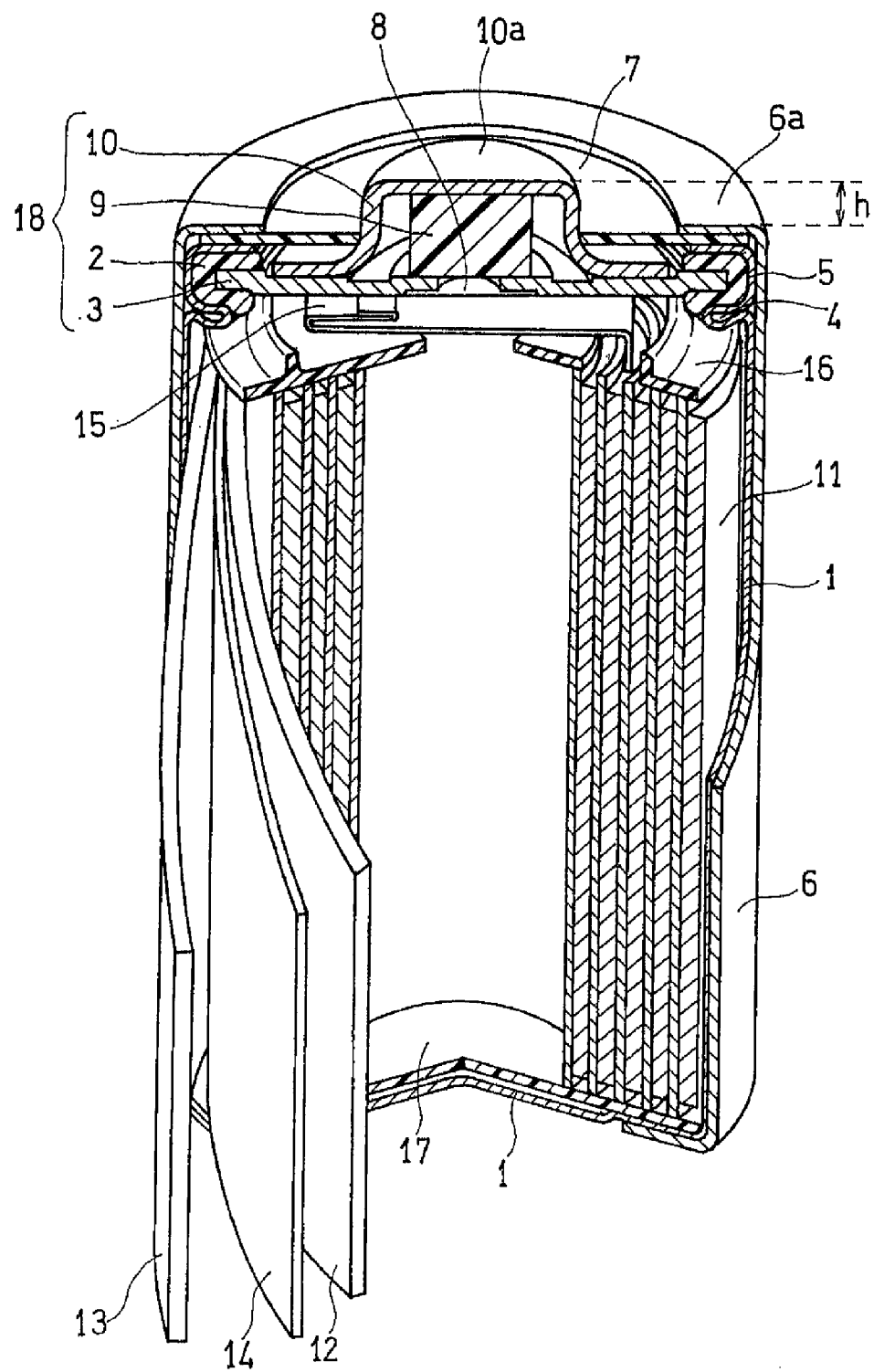
FIG. 1 is a schematic partially cutaway oblique view of a cylindrical nickel-metal hydride storage battery according to an embodiment of the present invention.
Figure 2:
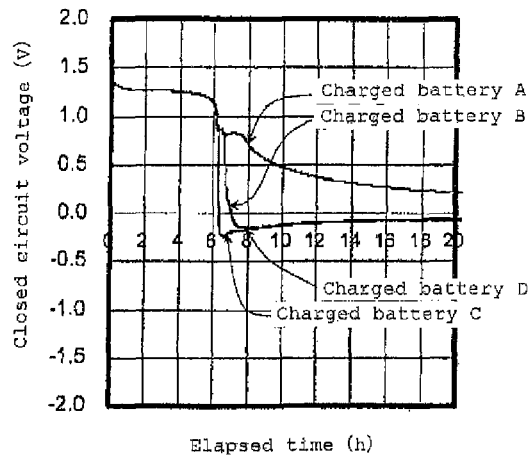
FIG. 2 is a graph showing transitions of closed circuit voltages of four AA nickel-metal hydride storage batteries A to D in a charged state, when a battery assembly including the four batteries connected in series is connected to a resistance of 16Ω and discharged at 20±1° C. for 20 hours.
Figure 3:
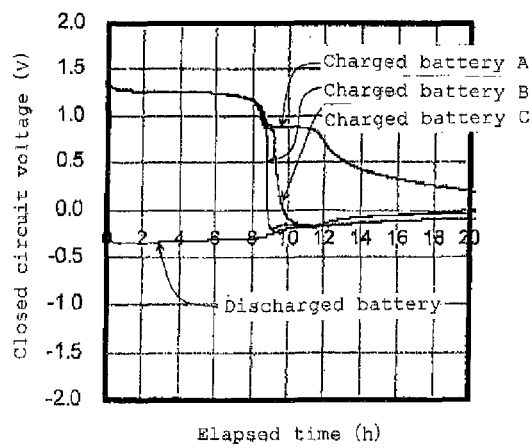
FIG. 3 is a graph showing transitions of closed circuit voltages of three AA nickel-metal hydride storage batteries A to C in a charged state and one AA nickel-metal hydride storage battery in a discharged state, when a battery assembly including the four batteries connected in series is connected to a resistance of 16Ω and discharged at 20±1° C. for 20 hours.
Figure 4:
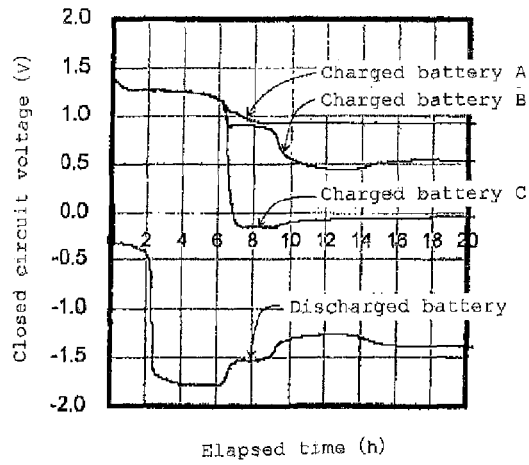
FIG. 4 is a graph showing transitions of closed circuit voltages of three AA nickel-metal hydride storage batteries A to C in a charged state and one AA nickel-metal hydride storage battery in a discharged state, when a battery assembly including the four batteries connected in series is connected to a resistance of 8.2Ω and discharged at 20±1° C. for 20 hours.

A nickel-metal hydride storage battery of the present invention includes a positive electrode, a negative electrode, a separator interposed therebetween, and an alkaline electrolyte. The negative electrode includes: a negative electrode material mixture layer including hydrogen storage alloy powder capable of electrochemically absorbing and releasing hydrogen; and a water-repellent layer including a first polymer including tetrafluoroethylene as monomer units, formed on the surface of the negative electrode material mixture layer.

The separator includes: a primary layer having a non-woven fabric structure of fibers; and a composite layer formed on the surface of the primary layer and being in contact with the water-repellent layer in the negative electrode. The composite layer includes: fibers in continuity with the non-woven fabric structure; and a second polymer including tetrafluoroethylene as monomer units. The surface of the composite layer has a contact angle with water of 10 to 80°.

In the nickel-metal hydride storage battery, hydrogen gas and oxygen gas generated at the positive electrode reach the negative electrode; and then, are oxidized and reduced, respectively, at a three-phase boundary formed on the negative electrode and thereby converted to water. By the above, hydrogen gas and/or oxygen gas are absorbed in the negative electrode, and rise in the internal pressure of the battery is suppressed. As such, since hydrogen gas and oxygen gas are generated at the positive electrode, diffusion of hydrogen gas and/or oxygen gas is also important for gas absorption at the negative electrode. Moreover, since the separator is interposed between the positive electrode and the negative electrode, gas diffusion inside the separator is evidently also important for facilitating gas absorption at the negative electrode.

The electrolyte in the nickel-metal hydride storage battery is an aqueous alkaline solution. Since hydroxide ions in the aqueous alkaline solution become involved in charge and discharge reactions, the separator needs to be sufficiently impregnated with the aqueous electrolyte. Therefore, from the past, a separator for nickel-metal hydride storage batteries has been made hydrophilic by a hydrophilization treatment. However, a separator with high hydrophilicity has high wettability by an alkaline electrolyte and therefore has low diffusion of hydrogen gas and/or oxygen gas.

In Patent Literature 3, a dispersion of a water repellent agent is directly applied to a separator by using rollers. Since high water repellency is imparted to the separator obtained as above, diffusion of hydrogen gas and/or oxygen gas therein is presumably high to a certain extent. However, water repellency of the separator is too high, and therefore, absorption of the alkaline electrolyte therein becomes low and the battery characteristics degrade.

In order to efficiently transfer hydrogen gas and/or oxygen gas generated at the positive electrode to the negative electrode, gas diffusion in the separator evidently needs to be increased. In order to increase gas diffusion in the separator, a three-phase boundary of a vapor phase (gas), a liquid phase (alkaline electrolyte), and a solid phase (separator) needs to be formed in the separator.

In the present invention, the separator has the composite layer including particles including the second polymer, and the surface of the composite layer has a water contact angle in the above range. Therefore, moderate water repellency can be imparted to the separator, while hydrophilicity is also secured for the separator. Thus, the above kind of three-phase boundary can be easily formed in the separator. When such three-phase boundary is formed in the separator, a channel for gas permeation is formed in the separator. Formation of such gas channel allows hydrogen gas and oxygen gas to diffuse at a high diffusion rate in the separator from the positive electrode side toward the negative electrode side. Hydrogen gas and/or oxygen gas that reach the negative electrode are efficiently absorbed at the three-phase boundary on the negative electrode.

Patent Literature 3 discloses that a water repellent agent can be distributed as far as to the inside of the separator. However, for the water repellent agent to be distributed to such extent by the method in Patent Literature 3, large amounts of the water repellent agent need to be applied to the separator surface. Therefore, the separator surface with the water repellent agent applied thereto has large amounts of the water repellent agent adhering thereto and becomes very high in water repellency. Moreover, when the water repellent agent adheres to the separator surface by direct application, large amounts of the water repellent agent migrate until reaching deep inside the separator, and the inside of the separator also becomes high in water repellency. Due to the above, not only the separator surface with the water repellent applied thereto, but also the inside of the separator greatly degrade in absorption of the alkaline electrolyte. Thus, the above kind of three-phase boundary is unlikely to be formed in the separator by the method in Patent Literature 3.

For the nickel-metal hydride storage battery, the positive electrode, the negative electrode, the separator, and the alkaline electrolyte are housed in a bottom-closed cylindrical battery case having an opening portion; and the opening portion is sealed with a sealing body.

Next, the components of the nickel-metal hydride storage battery of the present invention will be described in more detail.

(Separator)

The separator has: a primary layer having a non-woven fabric structure of fibers; and a composite layer formed on the surface of the primary layer. The composite layer has a non-woven fabric structure in continuity with the non-woven fabric structure of the primary layer; and is provided with moderate water repellency due to including a second polymer. That is, the separator has a non-woven fabric as the base; and has on one surface side, the composite layer which is the non-woven fabric provided with moderate water repellency. The second polymer functions as a water repellent agent.

The fibers which form the non-woven fabric structure of the primary layer and the composite layer can be formed of a material known as a separator material for nickel-metal hydride storage batteries and examples include various resins. Examples of resin included in the fibers include: polyolefin resins such as polyethylene, PP, and an ethylene-propylene copolymer; polyamide resins such as aromatic polyamides; vinyl resins such as polyvinyl acetate and saponified product thereof; acrylic resins; and cellulose and its derivatives (e.g., cellulose ethers, cellulose esters). These resins can be used singly or in a combination of two or more. Among these resins, polyolefin resins are preferred in terms of easily imparting hydrophilicity and water repellency to the separator in a balanced manner.

The average fiber diameter of the fibers forming the non-woven fabric structure is, for example, 0.8 to 20 μm and preferably 1 to 15 μm.

The fibers forming the non-woven fabric structure may include two or more kinds of fibers with different average fiber diameters in order to increase strength and other factors. Such fibers may include, for example: a first fiber with an average fiber diameter of 5 to 20 μm; and a second fiber with an average fiber diameter of 0.8 μm or more and less than 5 µm (e.g., 0.8 to 4 µm). The average fiber diameter of the first fiber is preferably 8 to 12 The average fiber diameter of the second fiber is preferably 1 to 3 µm. The content of the second fiber may be, for example, 1 to 20 mass % or 5 to 15 mass % of the fibers in whole.

The weight per unit area of the non-woven fabric forming the separator is, for example, 35 to 75 g/m$^2$, preferably 40 to 60 g/m$^2$, and further preferably 45 to 55 g/m$^2$, when without the composite layer.

When the average fiber diameter and/or the weight per unit area of the non-woven fabric structure are in the above ranges, excessive hydrophobization of only the separator surface side can be more effectively suppressed, and also, the composite layer with a moderate thickness can be easily formed in the separator. Thus, the three-phase boundary can be easily formed in the separator.

The non-woven fabric forming the separator may be subjected to a hydrophilization treatment, in view of increasing the wettability of the separator by the alkaline electrolyte. For example, the non-woven fabric including a polyolefin resin is preferably used after undergoing a hydrophilization treatment.

The method for the hydrophilization treatment of the non-woven fabric is not particularly limited, and may be a known method such as a sulfuric acid treatment, a fluorine treatment, or a plasma treatment. By the hydrophilization treatment, the non-woven fabric is hydrophilized (e.g., sulfonated) due to a hydrophilic functional group such as a sulfone group (—SO$_3$H), —OH, or —COOH being introduced to at least a part of the fibers forming the non-woven fabric. Thus, wettability of the separator by the alkaline electrolyte can be increased.

Particularly, the non-woven fabric subjected to a sulfuric acid treatment among the hydrophilization treatments has a slightly lower absorption rate for the alkaline electrolyte, but is capable of higher retention of the alkaline electrolyte, compared to when subjected to other hydrophilization treatments. When the non-woven fabric subjected to a sulfuric acid treatment is used as the separator, the alkaline electrolyte is retained in large amounts in the separator, and the three-phase boundary is unlikely to be formed in the separator; therefore, compared to use of the non-woven fabric subjected to other hydrophilization treatments such as a plasma treatment, the internal pressure of the battery tends to rise more easily.

In the present invention, even when the separator uses the non-woven fabric treated with sulfuric acid, formation of the composite layer can suppress rise in the internal pressure of the battery. Therefore, even when the nickel-metal hydride storage battery is used as a battery assembly including two or more batteries, polarity reversal and rise in the internal pressure in some of the batteries can be suppressed, and as a result, leakage of the alkaline electrolyte from the batteries can be suppressed.

The degree of sulfonation of the separator (non-woven fabric) is, for example, 1.9×10$^{-3}$ to 3.6×10$^{-3}$, preferably 2×10$^{-3}$ to 3×10$^{-3}$, and further preferably 2.1×10$^{-3}$ to 2.6× 10$^{-3}$. By the degree of sulfonation in such range, wettability of the separator by the alkaline electrolyte can be easily increased. This, combined with the effects of the composite layer and the water-repellent layer, is favorable in view of allowing easier formation of the three-phase boundary in the separator. The degree of sulfonation can be expressed as the ratio of the number of sulfur atoms to the number of carbon atoms in the separator.

The second polymer serving as the water repellent agent in the composite layer may be either a homopolymer of tetrafluoroethylene (polytetrafluoroethylene (PTFE)) or a copolymer of tetrafluoroethylene, as long as the tetrafluoroethylene is contained therein as monomer units. Examples of a copolymerizable monomer which forms a copolymer with tetrafluoroethylene include: fluorine-containing monomers such as hexafluoropropylene, chlorotrifluoroethylene, perfluoroalkyl vinyl ethers, and vinylidene fluoride; and olefins such as ethylene and propylene. These copolymerizable monomers can be used singly or in a combination of two or more.

Specific examples of the copolymer include: copolymers of tetrafluoroethylene and a fluorine-containing monomer such as a tetrafluoroethylene-hexafluoropropylene copolymer (PFEP), a tetrafluoroethylene-hexafluoropropylene-vinylidene fluoride copolymer, a tetrafluoroethylene-perfluoroalkyl vinyl ether copolymer (PFA), and a tetrafluoroethylene-perfluoroalkyl vinyl ether-vinylidene fluoride copolymer; and copolymers of tetrafluoroethylene and an olefin such as a tetrafluoroethylene-ethylene copolymer (PETFE). These second polymers can be used singly or in a combination of two or more.

The content of the tetrafluoroethylene units in the second polymer is, for example, 60 mol % or more, preferably 70 mol % or more, and further preferably 80 mol % or more. The upper limit of the content of the tetrafluoroethylene units is 100 mol %, and is less than 100 mol % and preferably 95 mol % or less when in the copolymer. Here, the lower and upper limits can be arbitrarily combined.

In the composite layer, the form of the second polymer serving as the water repellent agent is not particularly limited; and to allow easier formation of the three-phase boundary, the composite layer preferably includes particles (particles B) including the second polymer. Such particles B may include only the second polymer; or may include, in addition to the second polymer, another resin (e.g., polyolefin resin, another fluorine-containing resin) and/or an additive. The content of the second polymer in the particles B is, for example, 80 mass % or more and preferably 90 mass % or more. The content of the second polymer in the particles B is 100 mass % or less.

The maximum particle size of the particles B including the second polymer is, for example, 25 µm or less (e.g., 22 µm or less), preferably 5 µm or less, further preferably 2.2 µm or less, and particularly preferably less than 2 µm (e.g., 1.5 µm or less or 1.2 µm or less). Moreover, the maximum particle size is, for example, 0.3 µm or more, preferably 0.4 µm or more, and further preferably 0.5 µm or more. Here, the upper and lower limits can be arbitrarily selected and combined. The maximum particle size may also be, for example, 0.3 to 25 µm or 0.4 to 2 µm.

The average particle size of the particles B is, for example, 0.1 µm or more, preferably 0.17 µm or more, and further preferably 0.2 µm or more or 0.45 µm or more. Moreover, the average particle size is, for example, 15 µm or less (e.g., 13 µm or less), preferably 2 µm or less, further preferably 1.5 µm or less, and particularly preferably less than 1.2 µm (e.g., 0.8 µm or less or 0.6 µm or less). Here, the lower and upper limits can be arbitrarily selected and combined. The average particle size of the particles B may also be, for example, 0.1 to 15 µm or 0.17 to 1.5 µm.

When the maximum particle size and/or the average particle size of the particles B are in the above ranges, the composite layer with a moderate thickness can be easily formed, and the water contact angle of the composite layer surface can be easily controlled to a moderate range.

The BET specific surface area of the particles B is, for example, 2.5 m$^2$/g or more, preferably 2.8 m$^2$/g or more, further preferably over 4 m²/g (e.g., 5.5 m²/g or more), and particularly preferably 6 m²/g or more. Moreover, the BET specific surface area is, for example, 20 m²/g or less, preferably 15 m²/g or less, and further preferably 10 m²/g or less. Here, the lower and upper limits can be arbitrarily selected and combined. The BET specific surface area of the particles B may also be, for example, 2.5 to 20 m²/g or 2.8 to 15 m²/g. Note that the BET specific surface area can be measured by a method such as nitrogen gas adsorption. When the BET specific surface area of the particles B is in the above range, the water contact angle of the composite layer surface can be easily controlled to a moderate range, and balance between water repellency and hydrophilicity of the composite layer can be easily obtained.

In the present invention, water repellency of the surface of the separator on the composite layer side (the surface of the composite layer) can be controlled to a moderate range.

The water contact angle of the composite layer surface is 10° or more (e.g., 12° or more), preferably 15° or more (e.g., 25° or more), and further preferably over 27° (e.g., 32° or more). Moreover, the water contact angle is 80° or less (e.g., 70° or less), preferably 68° or less, and further preferably 50° or less. Here, the lower and upper limits can be arbitrarily selected and combined. The water contact angle of the composite layer surface is 10° to 80°, and may also be, for example, 12° to 70° or 25° to 68°.

When the water contact angle of the composite layer surface is less than 10°, the three-phase boundary is unlikely to be formed in the separator; and therefore, gas diffusion decreases and gas absorption by the negative electrode does not progress efficiently. Thus, rise in the internal pressure of the battery cannot be prevented; and when the nickel-metal hydride storage battery is used as a battery assembly and some of the batteries therein undergo a polarity reversal, leakage of the alkaline electrolyte tends to occur. Moreover, when the water contact angle of the composite layer surface exceeds 80°, the alkaline electrolyte is unlikely to permeate the separator, and also, retention of the alkaline electrolyte by the separator decreases. This results in degradation of the battery characteristics.

The composite layer in the separator preferably exhibits the water contact angle as above, when inside the battery. For measurement of the water contact angle, measurement is preferably conducted on the surface of the composite layer in the separator taken out from the battery that has been disassembled. The water contact angle of the surface of the composite layer in the separator can be obtained by, for example, dropping 5 μL of ion-exchanged water onto the composite layer surface from a height of 3 cm; and then, within 5 seconds, measuring the contact angle of the water droplet from a horizontal direction.

In the present invention, the water contact angle of the surface of the composite layer can be in a moderate range, and also, the composite layer with a moderate thickness can be formed in the separator. The thickness of the composite layer can be expressed by the maximum thickness thereof. The maximum thickness of the composite layer corresponds to the maximum depth of the portion of the separator where the second polymer is distributed, measured from the separator surface.

The maximum thickness of the composite layer is, for example, 1 μm or more, preferably 3 μm or more (e.g., 5 μm or more), and further preferably 7 μm or more. Moreover, the maximum thickness of the composite layer is, for example, 25 μm or less, preferably 20 μm or less (e.g., 15 μm or less), and further preferably 13 μm or less (e.g., 12.3 μm or less). Here, the lower and upper limits can be arbitrarily selected and combined. The maximum thickness of the composite layer may also be, for example, 1 to 25 μm or 7 to 15 μm.

When the maximum thickness of the composite layer is in the above range, high absorption and high retention of the alkaline electrolyte by the separator can be more effectively maintained, and also, moderate water repellency can be more effectively imparted to the separator. Therefore, since the three-phase boundary can be easily formed in the separator, gas diffusion in the separator can be effectively increased. This allows gas absorption at the negative electrode to be more effectively facilitated.

The maximum thickness of the composite layer is, for example, 2% or more, preferably 5% or more, and further preferably 7% or more of the thickness (average thickness) of the separator in whole. Moreover, the maximum thickness of the composite layer is, for example, 20% or less, preferably 16% or less, and further preferably 15% or less of the thickness (average thickness) of the separator in whole. Here, the lower and upper limits can be arbitrarily selected and combined. The maximum thickness of the composite layer may also be, for example, 2 to 20% or 5 to 16% of the thickness of the separator in whole. When the proportion of the maximum thickness of the composite layer relative to the thickness of the separator in whole is in the above range, balance between retention of the alkaline electrolyte and gas diffusion can be more effectively obtained.

The maximum thickness of the composite layer is preferably in the above range, inside the battery. The maximum thickness of the composite layer can be measured, for example, by taking a scanning electron microscope (SEM) image of a section of the separator taken out from the battery that has been disassembled, and basing the measurement on that image.

The separator having the composite layer as above can be obtained by: forming the water-repellent layer including the second polymer, on the surface of a base material; stacking the non-woven fabric which forms the separator, on the surface of the water-repellent layer; and then applying pressure to the resultant in order to transfer the second polymer in the water-repellent layer to the non-woven fabric. For the base material, a base material sheet of resin, metal, or the like may be used; or the negative electrode may be used. The water-repellent layer is formed by applying a solution or dispersion including the second polymer to the surface of the base material, and then drying the resultant. Since drying is included in the formation of the water-repellent layer, water repellency at the surface of the composite layer and inside the composite layer can be prevented from becoming higher than necessary, which differs from the method in Patent Literature 3 in which a dispersion is directly applied to a separator with use of rollers.

When the water-repellent layer is formed on the negative electrode, at the time of producing the electrode assembly or the battery, the second polymer in the water-repellent layer can be transferred to the non-woven fabric interposed between the negative electrode and the positive electrode, thereby allowing formation of the composite layer. Therefore, it is simple and convenient. However, at the time of producing the electrode assembly or the battery, the pressure applied to the negative electrode and the separator (non-woven fabric) needs to be controlled; or else, the second polymer would merely attach to the separator surface, and it would be difficult to form the separator via transfer of the second polymer into the non-woven fabric structure of the separator. Therefore, as described below, it is necessary to control the pressure applied to the negative electrode and the separator during the production process of the electrode assembly for the battery.

(Negative Electrode)

The negative electrode includes: a negative electrode material mixture layer; and a water-repellent layer including a first polymer formed on the surface of the negative electrode material mixture layer. The first polymer includes tetrafluoroethylene as monomer units. The negative electrode may include: a core material; and the negative electrode material mixture layer adhering to the core material.

For the negative electrode core material, a known one can be used. Examples include conductive porous or non-porous substrates formed of steel or steel alloy (e.g., stainless steel), nickel or nickel alloy, or the like. For the porous substrate, for example, a sheet substrate having a plurality of through-holes in the thickness direction of the substrate can be used; and specific examples include punched metal, body of sintered metal powder, expanded metal, and metal net (nickel net). The core material may be plated as necessary.

The negative electrode material mixture layer can be formed on at least the surface of the core material. The negative electrode material mixture layer may be formed on one surface of the core material in sheet form, or on both surfaces thereof. When the core material is porous, the pores of the core material may be filled with a negative electrode material mixture to form a negative electrode material mixture layer.

The negative electrode material mixture layer can be formed by molding of the negative electrode material mixture or by adhesion of the negative electrode material mixture to the core material. The negative electrode material mixture includes hydrogen storage alloy powder capable of electrochemically absorbing and releasing hydrogen serving as a negative electrode active material, and may further include a dispersion medium. Moreover, to the negative electrode material mixture, known components used in negative electrode material mixtures such as a binder, a conductive agent, and a thickener may be added as necessary. Specifically, the negative electrode material mixture layer is formed by, for example, applying the negative electrode material mixture to the core material, removing the dispersion medium from the resultant by drying, and then pressing the resultant.

Hydrogen storage alloy which forms the hydrogen storage alloy powder is not particularly limited, as long as it can absorb hydrogen electrochemically generated in the alkaline electrolyte during charge, and can easily release the absorbed hydrogen during discharge; and can be a known one in the field of nickel-metal hydride storage batteries.

The hydrogen storage alloy preferably includes Ni and Mg; and in addition to these elements, may further include at least one selected from the group consisting of the elements of periods 4 to 6 in groups 2 to 6 (including lanthanide elements), the elements of period 4 in groups 7 to 9 and groups 11 to 12, and elements of periods 3 to 5 in groups 13 to 14 of the periodic table.

The hydrogen storage alloy preferably includes an element Ln, Mg, Ni, and Al; and in addition to these elements, may further include an element M (at least one selected from the group consisting of V, Nb, Ta, Cr, Mo, Mn, Fe, Co, Ga, Zn, Sn, In, Cu, Si, P, and B). The element Ln is at least one selected from the group consisting of group 3 elements and group 4 elements of the periodic table. The element Ln is preferably at least one selected from the group consisting of Y, lanthanide elements, Zr, and Ti (particularly, at least one selected from the group consisting of La, Pr, Nd, Sm, and Zr). The element Ln may include Y and an element other than Y.

The equilibrium hydrogen pressure of the hydrogen storage alloy including Y and/or a lanthanide element, Mg, and Ni tends to increase. When the equilibrium hydrogen pressure increases, hydrogen gas absorption at the negative electrode tends to decrease, and therefore, the internal pressure of the battery tends to rise. However, in the present invention, even with use of the hydrogen storage alloy having a composition likely to cause increase in the equilibrium hydrogen pressure as above, hydrogen generated in the battery can be more effectively absorbed because the separator used has the composite layer as above and the negative electrode has the water-repellent layer. Moreover, since use of the hydrogen storage alloy having a composition as above allows increase in the equilibrium hydrogen pressure, operability of a device can be more effectively secured, even with use of the nickel-metal hydride storage battery as an alternative to a dry battery.

In the hydrogen storage alloy including the element Ln, Mg, Ni, and Al, a molar ratio x of the Mg in the total of the element Ln and the Mg is, for example, $0.01 \le x \le 0.5$, preferably $0.1 \le x \le 0.4$, and further preferably $0.25 \le x \le 0.35$. A molar ratio y of the Ni relative to the total of the element Ln and the Mg is, for example, $1.6 \le y \le 4$, preferably $2 \le y \le 4$, and further preferably $2.5 \le y \le 3.5$. A molar ratio $\alpha$ of the Al relative to the total of the element Ln and the Mg is, for example, $0.01 \le \alpha \le 0.3$, preferably $0.01 \le \alpha < 0.06$, and further preferably $0.03 \le \alpha \le 0.055$ (e.g., $0.03 \le \alpha \le 0.05$).

When the hydrogen storage alloy includes the element M, a molar ratio z of the element M relative to the total of the element Ln and the Mg is $0.01 \le z \le 0.8$ and preferably $0.1 \le z \le 0.75$.

The element M preferably includes at least Co. A molar ratio z1 of the Co relative to the total of the element Ln and the Mg is, for example, $0.25 \le z1 \le 0.75$ and preferably $0.25 \le z1 \le 0.7$ or $0.25 \le z1 \le 0.6$. The element M may further include Sn in addition to the Co.

The hydrogen storage alloy may have a crystal structure of, for example, an $AB_2$-type, an $AB_3$-type (i.e., $CeNi_3$-type), an $AB_5$-type (e.g., $LaNi_5$, $MmNi_5$ (where Mm represents a mischmetal)), or an $A_2B_7$-type (i.e., $Ce_2Ni_7$-type). In the hydrogen storage alloy of an $AB_3$-type or $A_2B_7$-type, the Mg and the La among the above elements are present in the A site, and the Ni, the Co, and the Al thereamong are present in the B site. In view of increasing the capacity of the battery, the hydrogen storage alloy of an $AB_3$-type or an $A_2B_7$-type is preferably used.

For the dispersion medium, a known medium such as water, an organic medium, or a mixed medium thereof can be used. Examples of the organic medium include: alkanols such as ethanol and isopropanol; aliphatic ketones such as acetone; aliphatic nitriles such as acetonitrile; ethers such as diethyl ether and tetrahydrofuran; and N-methyl-2-pyrrolidone. The dispersion medium preferably includes at least water, although this depends on the kinds of the other components included in the negative electrode material mixture, such as the binder.

The binder serves to bind the hydrogen absorbing alloy powder and the conductive agent to each other and/or to the core material. Examples of the binder include: resin materials (e.g., thermoplastic resins, thermosetting resins) such as rubber materials such as styrene-butadiene copolymer rubber (SBR); polyolefin resins such as polyethylene and polypropylene; fluorocarbon resins such as PTFE, tetrafluoroethylene copolymers (e.g., copolymers given above as examples for the second polymer), polychlorotrifluoroethylene, chlorotrifluoroethylene copolymers (e.g., copolymers of chlorotrifluoroethylene and an olefin such as ethylene), polyvinylidene fluoride, and vinylidene fluoride copolymers; and acrylic resins such as ethylene-acrylic acid copolymers, ethylene-methacrylic acid copolymers, and ethylene-methyl acrylate copolymers, and crosslinked products with Na ions thereof.

An example of a copolymerizable monomer for forming a vinylidene fluoride copolymer is at least one selected from the group consisting of, for example: fluorinated olefins such as hexafluoropropylene and chlorotrifluoroethylene; and perfluoroalkyl vinyl ethers such as perfluoromethyl vinyl ether.

The above binders can be used singly or in a combination of two or more.

The amount of the binder is, for example, 0.01 to 5 parts by mass and preferably 0.05 to 2 parts by mass, relative to 100 parts by mass of the hydrogen storage alloy powder.

In the case of using the dispersion medium including water, a dispersion including the dispersion medium and the binder dispersed in advance in at least apart of the dispersion medium, may be used when preparing the negative electrode material mixture. When the negative electrode material mixture prepared as such is applied to the core material or the like and dried at a high temperature (e.g., temperature of 70° C. or more), the binder becomes distributed to the surface of the negative electrode material mixture layer by migration, thereby allowing increase in the binding strength of the negative electrode material mixture layer to the water-repellent layer.

The conductive agent is not particularly limited other than being an electron-conductive material, and various electron-conductive materials can be used. Specific examples include: graphites such as natural graphite (e.g., flake graphite), artificial graphite, and expanded graphite; carbon blacks such as acetylene black and Ketjen black; conductive fibers such as carbon fibers and metal fibers; metal powders such as copper powder; and conductive organic materials such as polyphenylene derivatives. These conductive agents can be used singly or in a combination of two or more. Among these, artificial graphite, carbon blacks such as Ketjen black, and carbon fibers are preferred.

The amount of the conductive agent is, for example, 0.01 to 5 parts by mass and preferably 0.05 to 2 parts by mass, relative to 100 parts by mass of the hydrogen storage alloy powder.

The conductive agent may be added to the negative electrode material mixture and mixed with the other components. Alternatively, the particle surface of the hydrogen storage alloy powder may be coated with the conductive agent in advance. Such coating can be conducted by a known method such as: dredging the particle surface of the hydrogen storage alloy powder with the conductive agent; causing a dispersion including the conductive agent to adhere to the surface thereof, and then drying the resultant; and/or mechanically coating the surface thereof with the conductive agent by a mechanochemical method or the like.

The thickener imparts viscosity to the negative electrode material mixture (in slurry or paste form). The thickener can be arbitrarily selected in accordance with the kind of the dispersion medium used, and examples include: cellulose derivatives such as carboxymethyl cellulose (CMC) and modified substances thereof (including salts such as Na salts) and methyl cellulose; acrylic resins having acrylic acid units or methacrylic acid units, such as polyacrylic acid and polymethacrylic acid, and salts thereof; saponified products of polymers having vinyl acetate units, such as polyvinyl alcohol; and polyalkylene oxides such as polyethylene oxides. These thickeners can be used singly or in a combination of two or more.

When the dispersion medium includes water, among the above thickeners, ones including a hydrophilic group such as a carboxyl group (or a salt thereof), a hydroxyl group, or polyoxyethylene units are preferred.

The amount of the thickener is, for example, 0.01 to 5 parts by mass and preferably 0.05 to 1 part by mass, relative to 100 parts by mass of the hydrogen storage alloy powder.

The negative electrode material mixture layer may further include a known additive such as an oxidation suppressing agent. Examples of the oxidation suppressing agent include yttrium oxide and ytterbium oxide.

The amount of the additive is, for example, 0.01 to 5 parts by mass and preferably 0.05 to 1 part by mass, relative to 100 parts by mass of the hydrogen storage alloy powder.

In the negative electrode, the water-repellent layer can be formed on the surface of the negative electrode material mixture layer in contact with the separator. For gas that has permeated the separator to be efficiently supplied to the three-phase boundary on the negative electrode surface, the negative electrode and the separator are made to overlap each other such that the water-repellent layer comes in contact with the composite layer in the separator.

For the first polymer serving as the water repellent agent in the water-repellent layer, an arbitrary selection can be made from ones similar to those listed for the second polymer as above. The water repellent agent has a catalytic effect of enhancing the performance of the hydrogen storage alloy in absorbing gases generated during overcharge and overdischarge.

When the composite layer in the separator is formed by transfer of the water repellent agent from the water-repellent layer in the negative electrode as described above, the first polymer serving as the water repellent agent in the water-repellent layer in the negative electrode is of the same kind as the second polymer as above. When the composite layer is formed by forming the water-repellent layer on the base sheet or the like and then transferring the second polymer to the separator from the water-repellent layer, the first polymer in the water-repellent layer in the negative electrode may be of a different kind from, or of the same kind as, the second polymer in the composite layer in the separator.

In the water-repellent layer, the form of the first polymer is not particularly limited; and for easier formation of the three-phase boundary, the composite layer preferably includes particles (particles A) including the first polymer. Such particles A may include only the first polymer; or may include, in addition to the first polymer, another resin (e.g., polyolefin resin, another fluorocarbon resin) and/or an additive. The content of the first polymer in the particles A is, for example, 80 mass % or more and preferably 90 mass % or more.

The maximum particle size, the average particle size, and the BET specific surface area of the particles A can be selected from ranges similar to those given for the particles B.

By forming the water-repellent layer on the surface of the negative electrode material mixture layer, gas absorption of the negative electrode can be increased, and hydrogen gas and oxygen gas generated in the battery can be efficiently absorbed at the negative electrode. Therefore, even when the battery capacity is increased, rise in the internal pressure of the battery can be suppressed; and therefore, leakage of the alkaline electrolyte can be suppressed. Therefore, a nickel-metal hydride storage battery with high reliability can be obtained.

In the nickel-metal hydride storage battery, the maximum thickness of the water-repellent layer in the negative electrode is, for example, 1 µm or more, preferably 5 µm or more, and further preferably 8 µm or more. Moreover, the maximum thickness of the water-repellent layer is, for example, 25 µm or less, preferably 22 µm or less (e.g., 16 µm or less), and further preferably 13.5 µm or less. Here, the lower and upper limits can be arbitrarily selected and combined. The maximum thickness of the water-repellent layer may also be, for example, 1 to 25 µm or 5 to 22 µm.

The maximum thickness of the water-repellent layer in the above range, combined with the effect of the three-phase boundary formed inside the separator, effectively facilitates gas absorption at the negative electrode surface. Particularly, the maximum thickness of the water-repellent layer being 5 µm or more and particularly 8 µm or more is favorable due to allowing easier formation of the three-phase boundary on the negative electrode surface. The maximum thickness of the water-repellent layer is that inside the nickel-metal hydride storage battery, and can be measured by disassembling the battery and taking out the negative electrode, taking a SEM image of a section of the negative electrode, and then conducting measurement based on the SEM image.

The water-repellent layer can be formed by applying a dispersion including the first polymer and a dispersion medium to the surface of the negative electrode material mixture layer, followed by drying. For the dispersion medium, an arbitrary selection can be made from ones similar to those given for the negative electrode material mixture layer, for example, in accordance with the kind of the first polymer used.

(Positive Electrode)

For the positive electrode, a known one for nickel-metal hydride storage batteries can be used.

The positive electrode may include: a core material; and an active material or an active material layer adhering to the core material. The positive electrode may be formed of sintered active material powder, or may be of a non-sintered kind.

The positive electrode can be formed, for example, by adhesion of a positive electrode material mixture (in slurry or paste form) including at least the positive electrode active material, to the core material. More specifically, the positive electrode can be formed by applying the positive electrode material mixture to the core material, drying the resultant to remove the dispersion medium, and then pressing the resultant.

For the positive electrode core material, a known one can be used; and examples include porous substrates formed of nickel or nickel alloy, such as a nickel foam and a sintered nickel plate. When a porous substrate is used as the positive electrode core material, the pores in the positive electrode core material are filled with the positive electrode material mixture.

Examples of the positive electrode active material include nickel compounds, specifically, nickel oxides such as nickel hydroxide and nickel oxyhydroxide. These positive electrode active materials can be used singly or in a combination of two or more.

In the positive electrode material mixture in slurry or paste form, usually, a dispersion medium is included; and as necessary, known components for positive electrodes such as a conductive agent and a thickener may be added. For the dispersion medium, a selection can be made from ones similar to those given for the negative electrode material mixture.

Examples of the binder include hydrophilic or hydrophobic polymers; and a selection may be made from the examples given for the binder or from the examples given for the thickener for the negative electrode material mixture. These binders can be used singly or in a combination of two or more. The amount of the binder is, for example, 0.1 to 15 parts by mass and preferably 0.5 to 10 parts by mass, relative to 100 parts by mass of the positive electrode active material.

For the conductive agent, a selection may be made from the examples given for the negative electrode material mixture; or a conductive cobalt oxide such as cobalt hydroxide or γ-type cobalt oxyhydroxide may be used. These conductive agents can be used singly or in a combination of two or more. The amount of the conductive agent is, for example, 0.1 to 10 parts by mass and preferably 0.5 to 5 parts by mass, relative to 100 parts by mass of the positive electrode active material.

The positive electrode material mixture may include a known additive such as a metal compound (e.g., an oxide, a hydroxide) such as zinc oxide, zinc hydroxide, or a cadmium compound (e.g., cadmium oxide).

(Others)

For the nickel-metal hydride storage battery, an electrode assembly may be produced using the negative electrode, the positive electrode, and the separator, such that the separator is interposed between the negative and positive electrodes. For the electrode assembly, the negative electrode, the positive electrode, and the separator therebetween may be spirally wound, or may be stacked and folded in a zigzag manner.

In producing the electrode assembly by winding or stacking, the stress between the negative electrode and the separator can be adjusted, thereby to transfer the water repellent agent from the water repellent layer in the negative electrode to the separator, and to thus facilitate formation of the composite layer. The stress applied to the separator can be expressed by, for example, the tension applied to the separator when wound; and the tension is, for example, 0.09 to 0.6 kg/cm, preferably 0.1 to 0.5 kg/cm, and further preferably 0.2 to 0.4 kg/cm.

(Alkaline Electrolyte)

For the alkaline electrolyte, for example, an aqueous solution including an alkaline solute is used. Examples of the alkaline solute include alkaline metal hydroxides such as lithium hydroxide, potassium hydroxide, and sodium hydroxide. These can be used singly or in a combination of two or more.

The concentration of the alkaline solute in the alkaline electrolyte is, for example, 3 to 10 mol/L and preferably 5 to 9 mol/L. The specific gravity of the alkaline electrolyte is, for example, 1.03 to 1.55 and preferably 1.11 to 1.32.

Next, with reference to a drawing, the configuration of the nickel-metal hydride storage battery will be described in more detail.

FIG. 1 is a schematic partially cutaway oblique view of a cylindrical nickel-metal hydride storage battery according to an embodiment of the present invention.

The nickel-metal hydride storage battery includes: a bottom-closed cylindrical battery case (outer packaging can) 1 having an opening portion at the upper end; an electrode assembly 11 and an alkaline electrolyte (not illustrated) housed in the battery case 1; and a sealing body 18 for sealing the opening portion of the battery case 1.

The electrode assembly 11 includes a positive electrode 12, a negative electrode 13, and a separator 14 interposed therebetween, all in strip form (elongated sheet form), which overlap one another and are spirally wound. The outer circumference of the electrode assembly 11 corresponds to a part (outer circumference) of the negative electrode 13; and the outer circumference of the negative electrode 13 is in contact with the inner wall of the battery case 1 and thereby electrically connected thereto. That is, the battery case 1 serves as a negative terminal. At the upper part of the battery case 1, an annular groove 4 is formed in the manner of protruding inwards alongside the circumference of the battery case.

The sealing body 18 for sealing the opening portion of the battery case 1 includes: a conductive lid 3 having a round gas release hole 8 in the center; an annular insulation packing 2 attached to the peripheral edge of the lid 3; a columnar, insulating (e.g., rubber-made) valve member 9 disposed in the center of the top surface of the lid 3, in the manner of plugging the gas release hole 8; and a positive terminal 10 in cap form having a protruding portion which covers the valve member 9. To the inner bottom surface (lower surface in FIG. 1) of the lid 3, one end portion of a positive electrode lead 15 is welded, the other end thereof being connected to positive electrode 12 in the electrode assembly 11. The conductive lid 3 is in contact with the positive terminal 10; and is electrically connected to the positive electrode 12 and the positive terminal 10 via the positive electrode lead 15 and the lid 3.

In the battery case 1, a round insulating member 17 is disposed between the electrode assembly 11 and the inner bottom surface of the battery case 1; and a round insulating member 16 is disposed between the electrode assembly 11 and the sealing body 18. Provided at one part of the insulating member 16, is a slit for passing therethrough the positive electrode lead 15 that extends from the electrode assembly 11, so that the positive electrode lead 15 connects to the lid 3 in the sealing body 18.

The sealing body 18 is disposed on the inner side of the opening portion of the battery case 1; and the opening edge of the battery case 1 is crimped onto the peripheral edge portion of the sealing body 18, with the insulation packing 2 interposed therebetween. Thus, the nickel-metal hydride storage battery is hermetically sealed. At the part where the insulation packing 2 and the inner wall of the battery case 1 are in contact, a sealing agent (sealant) 5 is provided in order to increase sealability. Examples of the sealing agent include known ones such as blown asphalt, polybutenes, polyamides, and mixtures thereof.

After the battery case 1 is sealed with the sealing body 18, the sealing body 18 held down from above, while the circumferential surface of the battery case is pressed from the outside and along the height direction of the battery, thereby to reduce the diameter of the battery case. Such diameter reduction allows stress to also be applied between the negative electrode and the separator in the electrode assembly, thereby facilitating formation of the composite layer due to the water repellent agent in the water-repellent layer in the negative electrode being transferred to the separator. After the diameter reduction, the width (distance in vertical direction) of the annular groove 4 on the outer side of the battery case is reduced to within 0.2 mm, such that the groove portion is pressed. This allows adjustment of the battery height to the specified height.

The peripheral edge portion of the sealing body 18, the circumferential surface of the battery case 1, and the peripheral edge portion of the bottom surface of the battery case 1 are covered with an outer packaging label 6. A toroid-shaped insulating member 7 is disposed between the peripheral edge portion of the sealing body 18 and the outer packaging label 6.

In the sealing body 18, the positive terminal 10 has the protruding portion in the center, the protruding portion protruding outward (outward from the battery) and having a top surface 10a. The valve member 9 which is contained inside the protruding portion, is formed of an insulating material having elasticity such as rubber. Therefore, the valve member 9 is pressed to the lid 3 via the positive terminal 10. Thus, normally, the battery case 1 is hermetically sealed with the sealing body 18. However, when gas is generated inside the battery case 1 and the internal pressure of the battery rises, the valve member 9 becomes compressed, the gas release hole 8 opens, and then, the gas is released from inside the battery. That is, the sealing body 18 not only hermetically seals the battery case 1, but also serves as a safety mechanism (safety valve) for the battery.

A predetermined amount of the alkaline electrolyte is injected into the battery. Charge and discharge reactions progress between the positive electrode 12 and the negative electrode 13, via the alkaline electrolyte in the separator 14.

Regarding the nickel-metal hydride storage battery, the capacity of the battery can be increased, if the internal volume of the battery is increased by reducing the height of the protruding portion of the positive terminal while increasing the height of the battery case, and introducing the active materials into the battery in larger amounts. However, in such battery, the volume of the remaining space inside the battery is small. Therefore, generation of gas inside such battery would cause the internal pressure of the battery to easily rise.

In the present invention, since the negative electrode has the water-repellent layer and the separator has the composite layer, efficient gas absorption is possible at the negative electrode. Thus, even when the protruding portion of the positive terminal has a reduced height, the battery capacity is increased, and/or the battery diameter is reduced, the resultant battery can efficiently suppress rise in the internal pressure.

In the battery with such increased capacity, the height of the protruding portion of the positive terminal is, for example, 1 mm or more, preferably 1.4 mm or more, and further preferably 1.45 mm or more or 1.48 mm or more. Moreover, the height of the protruding portion is, for example, 1.64 mm or less, preferably 1.62 mm or less, or further preferably 1.57 mm or less. Here, the lower and upper limits can be arbitrary selected and combined. The height of the protruding portion may also be, for example, 1 to 1.64 mm or 1 to 1.62 mm.

The height of the protruding portion corresponds to the distance between the surface of the outer packaging label disposed on the peripheral edge portion of the sealing body and the top surface of the protruding portion. In FIG. 1, the height of the protruding portion is expressed by a height h from a surface 6a of the outer packaging label to the top surface 10a of the protruding portion.

For the cylindrical battery, the percentage of diameter reduction when assembling the battery is, for example, 95 to 99%, preferably 96 to 98.7%, and further preferably 97 to 98.5%. The percentage of diameter reduction corresponds to the proportion of the outer diameter of the battery case after diameter reduction relative to the outer diameter of the battery case before diameter reduction, expressed in percentage.

When a nickel-metal hydride storage battery is used as an alternative to a dry battery, it is mostly used as a battery assembly in which two or more batteries are connected in series. In such battery assembly, if the remaining capacities of some of the batteries are small, a polarity reversal would occur in those batteries during discharge and generation of gas would become prominent. In the present invention, since the negative electrode has the water-repellent layer and the separator has the composite layer, efficient gas absorption is possible at the negative electrode. Therefore, even when two or more of the nickel-metal hydride storage batteries are connected in series and used as a battery assembly, rise in the internal pressure of the battery can be effectively suppressed. Thus, even when generation of gas tends to become prominent during overdischarge for example, repeated release of the gas from the gas release hole can be suppressed, and therefore, leakage of the electrolyte can be suppressed. Therefore, a battery that is highly reliable even as an alternative to a dry battery, can be obtained.

EXAMPLES

Next, the present invention will be specifically described by way of Examples and Comparative Examples. The following Examples, however, are not to be construed as limiting the present invention.

Example 1

A cylindrical AA nickel-metal hydride storage battery having a capacity of 2500 mAh was produced by the following procedures:
(1) Production of Negative Electrode
Respective simple substances of La, Sm, Mg, Ni, Al, and Co in a mass ratio shown in Table 1 were placed in an induction melting furnace and melted, and an ingot was produced from the molten substance. The resultant ingot was heated at 1000° C. for 10 hours in an argon atmosphere, thereby to obtain an alloy ingot having a superlattice structure. The resultant ingot was then pulverized into coarse particles. The resultant coarse particles were further mechanically pulverized in an inert gas atmosphere and then sieved, thereby to produce hydrogen storage alloy powder (alloy powder A) having an average particle size of about 42 μm.

To 100 parts by mass of the hydrogen storage alloy powder obtained, 0.7 part by mass of SBR as a binder, 0.15 part by mass of CMC as a thickener, 0.3 part by mass of Ketjen black as a conductive agent, and 0.7 part by mass of yttrium oxide as an oxidation suppressing agent were added. Then, a moderate amount of water was added to the resultant, followed by mixing, thereby to produce a negative electrode slurry. The SBR was used in the form of a dispersion including 48 mass % of the SBR and 52 mass % of ion-exchanged water.

The negative electrode slurry obtained was applied to both surfaces of a punched metal (thickness: 60 μm, pore size: 1 mm, porosity: 42%) of nickel-plated iron serving as a negative electrode core material. This was followed by drying at 95° C. for 10 minutes. Thereafter, the coatings of the negative electrode slurry were pressed with rollers, together with the core material, thereby to form negative electrode material mixture layers. The pressing was conducted so that the total thickness of the core material and the negative electrode material mixture layers would be 0.35 to 0.37 mm. The resultant was cut to a size of 44.7 mm (width)×134.0 mm (length).

(2) Formation of Water-Repellent Layers Including PTFE
(a) Preparation of PTFE Dispersion
First, PTFE particles and ethanol in a mass ratio of 1:15 were mixed using an ultrasonic homogenizer (amplitude: 80 μm, frequency: 20 kHz), thereby to prepare a PTFE dispersion. The PTFE particles used had a BET specific surface area of 3 $m^2/g$ when determined by nitrogen gas adsorption, a maximum particle size of 20 μm, and an average particle size of 12 μm.
(b) Formation of Water-Repellent Layers
The PTFE dispersion obtained in (a) above, with the dispersed state of the PTFE particles maintained, were applied to surfaces of the negative electrode material mixture layers obtained in (1) above (i.e., surfaces of both of the negative electrode material mixture layers formed on surfaces of the negative electrode core material). At that time, the amount of the PTFE dispersion applied was 0.30 to 0.50 $mg/cm^2$. The resultant with the coatings thereon were dried at 120° C. for 1 minute, thereby to produce a negative electrode having water-repellent layers including PTFE formed on the surfaces of the negative electrode material mixture layers, respectively. At that time, the maximum thickness of the water-repellent layers was 9 to 20 μm.
(3) Production of Positive Electrode
A positive electrode of non-sintered nickel was produced by the following procedures.

First, nickel hydroxide powder containing 2.5 mass % of zinc and 1.0 mass % of cobalt as co-precipitation elements was added to an aqueous cobalt sulfate solution. While stirring the resultant mixture, an aqueous sodium hydroxide solution (sodium hydroxide concentration: 1 mol/L) was dropped little by little thereto to adjust the pH to 11. Thereafter, stirring was further continued for a predetermined time. Then, a precipitate was separated from the resultant mixture, by filtration. The separated precipitate was washed with water and then vacuum dried, thereby to obtain powder composed of nickel hydroxide particles having their respective surfaces coated with 5 mass % of cobalt hydroxide.

To 1 part by mass of the powder obtained above, 10 parts by mass of an aqueous sodium hydroxide solution (sodium hydroxide concentration: 48 mass %) was added. The resultant mixture, while stirred, was heat treated at 85° C. for 8 hours, and was then washed with water. This was followed by drying at 65° C. By the heat treatment, in the cobalt hydroxide-containing layer on the nickel hydroxide particle surface, the cobalt hydroxide partially became higher in order and converted to cobalt oxyhydroxide; and also, sodium was introduced into the layer. This resulted in obtaining composite particles including: the nickel hydroxide particles; and a coating layer containing the cobalt oxyhydroxide and 1 mass % of the sodium, formed on the nickel hydroxide particle surface.

To 100 parts by mass of mixed powder of the composite particles obtained and zinc oxide, 25 parts by mass of an aqueous solution containing CMC (CMC concentration: 0.2 mass %) as a binder was added, thereby to produce a positive electrode slurry. The mass ratio of the composite particles to the zinc oxide in the mixed powder was 100:2.

The positive electrode slurry obtained was introduced into pores of a nickel foam (area density (mass per unit area): about 325 $g/m^2$, thickness: about 1.2 mm), followed by drying. The dried product was pressed to a thickness of 0.78 mm and then cut to a size of 44.7 mm (width)×95.0 mm (length), thereby to obtain a positive electrode.

At one end portion of a positive electrode core material in the longitudinal direction thereof, an exposed portion not holding an active material was provided; and a positive electrode lead was connected to the exposed portion.

(4) Production of Nickel-Metal Hydride Storage Battery

A separator was disposed between the negative electrode including the water-repellent layers including PTFE obtained in (2) above and the positive electrode obtained in (3) above. Then, the resultant was spirally wound, thereby to obtain an electrode assembly. For the separator, a PP non-woven fabric (thickness: 90 µm, mass per unit area: 48 g/m$^2$) hydrophilized by a plasma treatment was used. Fibers forming the non-woven fabric included fibers with an average fiber diameter of 10 µm and ultrafine fibers with a fiber diameter of 1 to 3 µm; and the content of the ultrafine fibers was 20 mass % or less relative to of the fibers in whole. The tension during winding was 0.30 kgf/cm ($\approx$2.94 N/cm).

The electrode assembly obtained was inserted into a bottom-closed cylindrical metallic battery case (outer diameter: 14.25 mm) for AA batteries, having an annular groove on the side of an opening portion; and the negative electrode at the outermost circumference of the electrode assembly was brought into contact with the inner surface of the battery case. The positive electrode lead connected to the positive electrode was welded to the inner bottom surface of a lid in a sealing body. The sealing body included: the lid having a round gas release hole in the center; an insulation packing attached to the peripheral edge of the lid; a valve member disposed in the center of the top surface of the lid, in the manner of plugging the gas release hole; and a positive terminal in cap form having a protruding portion which covered the valve member.

Next, an alkaline electrolyte was injected into the battery case. Then, for sealing, the opening portion of the battery case was covered with the sealing body and then crimped, with the insulation packing interposed therebetween. The circumferential surface of the battery case was pressed form the outside, thereby to reduce the diameter until the outer diameter became 14.00 mm. Then, the battery case was pressed in the height direction, thereby to press the groove portion formed on the opening portion side of the battery case such that the overall height of the battery became 50.25 mm. For the alkaline electrolyte, an aqueous solution containing sodium hydroxide at a concentration of 7.5 mol/L was used.

On the upper portion of the sealing body, a toroid-shaped insulating member was disposed such that the protruding portion of the positive terminal protruded from the center hole of the insulating member. Next, an outer packaging label was attached to cover the peripheral edge portion of the sealing body (peripheral edge portion of the insulating member disposed on the sealing body), the circumferential surface of the battery case, and the peripheral edge portion of the bottom surface of the battery case, thereby to obtain a nickel-metal hydride storage battery. The height of the protruding portion of the positive terminal (distance from the surface of the outer packaging label disposed on the peripheral edge portion of the insulating member, to the top surface of the protruding portion of the positive terminal) was set to 1.48 mm.

The valve member disposed inside the protruding portion of the positive terminal and in the manner of plugging the gas release hole in the lid, typically worked such that application of a pressure of 2 to 5 MPa thereto would open the gas release hole. For the batteries for measuring the internal pressure as described below, the valve member was set to work with application of a pressure of 20 MPa or more. For the batteries used for evaluation other than for the internal pressure, the working pressure was set to about 3.1 MPa.

Example 2

A hydrogen storage alloy powder (alloy powder B) was produced as in Example 1, except that in (1) in Example 1, the respective simple substances of the metal elements shown in Table 1 were used in a mass ratio shown in Table 1. A negative electrode and a nickel-metal hydride storage battery were produced as in Example 1, except that the alloy powder B obtained was used.

Comparative Example 1

A nickel-metal hydride storage battery was produced as in Example 1, except that the water-repellent layers including PTFE were not formed on the surfaces of the negative electrode.

Comparative Example 2

A nickel-metal hydride storage battery was produced as in Example 2, except that the water-repellent layers including PTFE were not formed on the surfaces of the negative electrode.

Comparative Example 3

The PTFE dispersion used to form the water-repellent layer in Example 1 was applied in an amount of 0.8 mg/cm' to one surface of the PP non-woven fabric used in Example 1, followed by drying at 80° C. for 5 minutes, thereby to make the one surface of the non-woven fabric, water-repellent. A nickel-metal hydride storage battery was produced as in Comparative Example 2, except that the obtained non-woven fabric was used as the separator.

Evaluations of (1) to (5) below were conducted on each of the nickel-metal hydride storage batteries obtained in the Examples and the Comparative Examples. Before the evaluations, each of the batteries was activated in the following manner.

The nickel-metal hydride storage battery produced was charged at room temperature (25° C.) and a charge current of 250 mA (0.1 C) for 16 hours, followed by rest of 1 hour; and then discharged at a discharge current of 500 mA (0.2 C) until an end-of-discharge voltage of 1.0 V, followed by rest of 1 hour. Such charge and discharge were repeated for 5 cycles at room temperature (25° C.), thereby to activate the battery.

(1) Internal Pressure Characteristics of Battery

A hole having a diameter of 1.0 mm was opened in the bottom portion of the battery case of the nickel-metal hydride storage battery, and a pressure sensor was attached. The battery in such state was charged at various rates of charge up to 2.0 C, until reaching 200% of the positive electrode capacity. At each rate of charge, the inner pressure of the battery during charge was measured with the pressure sensor. A similar measurement was conducted on 5 batteries per Example and per Comparative Example, and the average internal pressure of the 5 batteries was calculated.

(2) Overdischarge Test

For each Example and each Comparative Example, four batteries were connected in series. At that time, for three among the four batteries, batteries that were discharged at a discharge current of 0.2 C with respect to battery capacity until an end-of-discharge voltage of 0.9 V and then charged at a charge current of 0.1 C for 16 hours, were used. For the remaining one battery (battery X), a battery that was discharged at a discharge current of 0.2 C with respect to battery capacity until an end-of-discharge voltage of 0.9 V, was used.

The above four batteries connected in series were connected to a circuit to which a resistance was connected, followed by discharge at 20±1° C. for 20 hours; and the minimum closed circuit voltage of the batteries at that time was measured.

The resistances used for connection to the circuit were 16Ω, 12Ω, and 8Ω.

(3) Water Repellency of Composite Layer Surface in Separator

After being activated, the nickel-metal hydride storage battery was discharged at a discharge current of 0.2 C with respect to battery capacity until an end-of-discharge voltage of 0.9 V. Then, the battery was disassembled with a nipper; and the electrode assembly was taken out of the battery and separated into the positive electrode, the negative electrode, and the separator. After drying the separator, 5 μL, of ion-exchanged water was dropped to the surface of the composite layer in the separator, from a height of 3 cm; and within 5 seconds, the contact angle (°) of the droplet was measured from a horizontal direction, with use of a contact angle meter and a microscope.

(4) Maximum Thickness of Composite Layer

After being activated, the nickel-metal hydride storage battery was discharged at a discharge current of 0.2 C with respect to battery capacity until an end-of-discharge voltage of 0.9 V. Then, the battery was disassembled with a nipper; and the electrode assembly was taken out of the battery and separated into the positive electrode, the negative electrode, and the separator. The separator was cut to a size of 1 cm×1 cm, washed with ion-exchanged water, and then vacuum dried. Washing was conducted until the liquid after washing became neutral with a pH indicator paper.

The separator was embedded in epoxy resin and then cut to expose a section. The section was ground and then treated with alumina (average particle size: 1 μm or less) to impart a mirror finish. The treated surface was then coated with a conductive film (osmium), and an image of the resultant was taken using a SEM (HITACHI S-4500, applied voltage: 5 kV). The thickest portion of the composite layer in the taken image was measured as the maximum thickness.

(5) Maximum Thickness of Water-Repellent Layer

After being activated, the nickel-metal hydride storage battery was discharged at a discharge current of 0.2 C with respect to battery capacity until an end-of-discharge voltage of 0.9 V. Then, the battery was disassembled with a nipper; and the electrode assembly was taken out of the battery and separated into the positive electrode, the negative electrode, and the separator. The negative electrode was washed with ion-exchanged water and then vacuum dried. Washing was conducted until the liquid after washing became neutral with a pH indicator paper.

The negative electrode was embedded in epoxy resin and then cut to expose a section. The section was ground and then treated with alumina (average particle size: 1 μm or less) to impart a mirror finish. The treated surface was then coated with a conductive film (osmium), and an image of the resultant was taken using a SEM (HITACHI S-4500, applied voltage: 5 kV). The thickest portion of the water-repellent layer in the taken image was measured as the maximum thickness.

The evaluation results of (1) to (5) above are shown in Table 2.

TABLE 1

| Alloy powder | Metal element (mass %) | | | | | | | |
|---|---|---|---|---|---|---|---|---|
| | La | Nd | Sm | Zr | Mg | Ni | Co | Al |
| A | 10.65 | 0 | 28.36 | 0 | 1.00 | 53.00 | 6.55 | 0.44 |
| B | 7.60 | 15.35 | 16.01 | 0.28 | 0.81 | 58.55 | 0 | 1.39 |

TABLE 2

| | Alloy powder | Water repellent layer, maximum thickness (μm) | Composite layer | | Internal pressure of battery (MPa) | Overdischarge test Minimum closed circuit voltage (V) | | |
|---|---|---|---|---|---|---|---|---|
| | | | Maximum thickness (μm) | Contact angle on surface (°) | | 16Ω | 12Ω | 8Ω |
| Ex. 1 | A | 20 | 7 | 15 | 3.2 | −0.3 | −0.3 | −1.7 |
| Ex. 2 | B | 20 | 9 | 13 | 3.2 | −0.3 | −0.3 | −1.7 |
| Comp Ex. 1 | A | 0 | 0 | 0 | 5.8 | −0.3 | −1.7 | −1.7 |
| Comp Ex. 2 | B | 0 | 0 | 0 | 5.8 | −0.3 | −1.7 | −1.7 |
| Comp Ex. 3 | B | 0 | 40 | 150 | 5.7 | −0.3 | −1.7 | −1.7 |

As shown in Table 2, in the batteries of Comparative Examples 1 and 2 which used the negative electrode without the water-repellent layers and the separator without the composite layer, the internal pressures of the batteries during charge rose up to 5.8 MPa. In Comparative Example 3 which used the negative electrode without the water-repellent layer and had a very large contact angle of 150° on the composite layer surface, the internal pressure of the battery during charge was 5.7 MPa. These values were larger than 5 MPa that is the typical upper limit of the pressure for opening the gas release hole in the sealing body in the nickel-metal hydride storage battery. Therefore, when the working condition of the valve member was set for a typical nickel-metal hydride storage battery, the gas release hole would open very frequently and leakage of the alkaline electrolyte would be prominent.

In the batteries of Comparative Examples 1 to 3, when the resistance was 16Ω in the overdischarge test, the minimum closed circuit voltage of the battery X connected in a discharged state was −0.3 V, and leakage of the alkaline electrolyte was not visually observed. However, when the resistance was 12Ω or 8Ω, the minimum closed circuit voltage was −1.7 V, and leakage of the alkaline electrolyte was visually observed.

In contrast, in the batteries of Examples 1 and 2, the internal pressure during charge was 3.2 MPa, and was considerably lower compared to the batteries of the Comparative Examples. This was presumably because, in the batteries of the Examples, the negative electrode had the water-repellent layers and the separator had the composite layer, thereby allowing effective absorption of oxygen gas generated during charge. Moreover, in the batteries of the Examples, the internal pressure during charge was 3.2 MPa and thus smaller than 5 MPa typically being the upper limit of the pressure for opening the gas release hole in the sealing body in the nickel-metal hydride storage battery. Therefore, the batteries were evidently capable of stable use, even when the working condition of the valve member was set for a typical nickel-metal hydride storage battery.

became very large. This made it easier for gas generated at the positive electrode to widely diffuse inside the separator. Thus, efficient absorption of oxygen gas and hydrogen gas was presumably made possible at the three-phase boundary of the vapor phase, the liquid phase, and the solid phase (negative electrode active material) on the negative electrode surface.

Examples 3 to 12

Nickel-metal hydride storage batteries were produced as in Example 1 or 2, except that the PTFE used to form the water-repellent layers on the negative electrode surface was as shown in Table 3.

For the hydrogen storage alloy powder, the alloy powder A was used in Examples 3, 5, 7, 9, and 11; and the alloy powder B was used in Examples 4, 6, 8, 10, and 12.

For Examples 3 to 12 also, evaluations of (1) to (4) above were conducted as for Examples 1 and 2. The results are shown in Table 3.

TABLE 3

| | | PTFE | | | Maximum thickness of water-repellent layer | Composite layer | | Internal pressure of battery (MPa) | Overdischarge test Minimum closed circuit voltage (V) | | |
|---|---|---|---|---|---|---|---|---|---|---|---|
| | Alloy powder | Specific surface area (m²/g) | Maximum particle size (μm) | Average particle size (μm) | (μm) | Maximum thickness (μm) | Contact angle on surface (°) | | 16Ω | 12Ω | 8Ω |
| Ex. 1 | A | 3 | 20 | 12 | 20 | 7 | 15 | 3.2 | −0.3 | −0.3 | −1.7 |
| Ex. 2 | B | 3 | 20 | 12 | 20 | 9 | 13 | 3.2 | −0.3 | −0.3 | −1.7 |
| Ex. 3 | A | 4 | 2 | 1.2 | 15 | 9 | 26 | 3.2 | −0.3 | −0.3 | −1.7 |
| Ex. 4 | B | 4 | 2 | 1.2 | 15 | 10 | 27 | 3.2 | −0.3 | −0.3 | −1.7 |
| Ex. 5 | A | 6 | 1.2 | 0.6 | 13 | 10 | 34 | 3.2 | −0.3 | −0.3 | −0.3 |
| Ex. 6 | B | 6 | 1.2 | 0.6 | 13 | 11 | 34 | 3.2 | −0.3 | −0.3 | −0.3 |
| Ex. 7 | A | 9 | 1.0 | 0.5 | 11 | 12 | 47 | 3.2 | −0.3 | −0.3 | −0.3 |
| Ex. 8 | B | 9 | 1.0 | 0.5 | 11 | 11 | 46 | 3.2 | −0.3 | −0.3 | −0.3 |
| Ex. 9 | A | 12 | 0.7 | 0.3 | 10 | 11 | 67 | 3.2 | −0.3 | −0.3 | −0.3 |
| Ex. 10 | B | 12 | 0.7 | 0.3 | 10 | 11 | 67 | 3.2 | −0.3 | −0.3 | −0.3 |
| Ex. 11 | A | 14 | 0.5 | 0.2 | 9 | 12 | 67 | 3.2 | −0.3 | −0.3 | −0.3 |
| Ex. 12 | B | 14 | 0.5 | 0.2 | 9 | 13 | 67 | 3.2 | −0.3 | −0.3 | −0.3 |

In the overdischarge test for the batteries of Examples 1 and 2, when the resistance was 8Ω, the minimum closed circuit voltages of the batteries X connected to the circuit in a discharged state was −1.7 V, and leakage of the alkaline electrolyte was visually observed. However, when the resistance was 16Ω or 12Ω, the minimum closed circuit voltages of the batteries X was −0.3 V, and leakage of the alkaline electrolyte was not visually observed. This was presumably because, in the batteries of the Examples, the negative electrode had the water-repellent layers and the separator had the composite layer having moderate water repellency, thereby allowing effective absorption of hydrogen gas generated during overdischarge.

Note that the separator used in the batteries of the Examples had the composite layer including the PTFE particles. Therefore, in those batteries, moderate water repellency was imparted, not only to the water-repellent layers, but also to the composite layer in the separator in contact with the water-repellent layer. This allowed easy formation of a three-phase boundary of oxygen gas and hydrogen gas (vapor phase), liquid phase (alkaline electrolyte), and fibers (solid phase). Particularly, since the separator had the non-woven fabric structure of fibers, the surface area of the composite layer with water repellency As shown in Table 3, the results obtained for the batteries of Examples 3 and 4 with respect to the internal pressure and the minimum closed circuit voltage in the overdischarge test, were similar to those obtained for Examples 1 and 2; and the results obtained for the batteries of 5 to 12 with respect to the internal pressure were similar to those obtained for Examples 1 and 2. For the batteries of Examples 5 to 12, the minimum closed circuit voltages of the battery X in the overdischarge test were −0.3 V, whether the resistance was 16Ω, 12Ω, or 8Ω, and leakage of the alkaline electrolyte was not observed.

In Examples 1 to 12, the water contact angles of the surface of the composite layer in the separator became larger to a certain extent, as the BET specific surface areas of the PTFE particles used for the composite layer became larger and as the maximum particle sizes thereof and the average particle sizes thereof became smaller. In Examples 11 to 12, compared to Examples 9 to 10, the BET specific surface areas of the PTFE particles used were larger and the maximum particle sizes thereof and the average particle sizes thereof were smaller, but the water contact angles of the composite layer surface were the same as those in Examples 9 to 10.

For the batteries of Examples 5 to 12, excellent results were obtained from the overdischarge test, presumably because of easier formation of the three-phase boundary in the separator, due to the large water contact angles of the composite layer surface. Moreover, formation of the three-phase boundary in the separator presumably allowed a higher gas diffusion rate in the separator and an increased gas absorbability at the negative electrode surface.

In view of increasing the minimum closed circuit voltage of the battery X during overdischarge to suppress leakage of the alkaline electrolyte, the water contact angle of the composite layer surface preferably exceeded 27°. From a similar point of view, the PTFE particles used preferably had a BET specific surface area exceeding 4 m$^2$/g, a maximum particle size of less than 2 μm, and an average particle size of less than 1.2 μm.

Examples 13 to 14

Nickel-metal hydride storage batteries were produced as in Example 10, except that the heights of the protruding portion of the positive terminal (distance from the surface of the outer packaging label disposed on the peripheral edge portion of the insulating member, to the top surface of the protruding portion of the positive terminal) were increased as shown in Table 4, and the heights of the battery case were reduced in proportion to the heights of the protruding portion. Specifically, in Example 13, the height of the positive terminal was made 0.07 mm higher and the height of the battery case was made 0.07 mm lower compared to those in Example 10; and in Example 14, the height of the positive terminal was made 0.14 mm higher and the height of the battery case was made 0.14 mm lower compared to those in Example 10.

That is, in the batteries of Examples 13 and 14, the remaining spaces therein were smaller compared to that in the battery of Example 10. Note that when the height of the positive terminal was made higher than 1.62 mm, the volume of the battery case became too small; and the electrode assembly produced in Example 10 and the alkaline electrolyte could not be housed in the battery case.

For the batteries of Examples 13 and 14 also, evaluations of (1) and (2) above were conducted as for Example 10. The results are shown in Table 4.

TABLE 4

| | Alloy powder | Height of protruding portion (mm) | Internal pressure of battery (MPa) | Overdischarge test Minimum closed circuit voltage (V) | | |
|---|---|---|---|---|---|---|
| | | | | 16Ω | 12Ω | 8Ω |
| Comp. Ex. 2 | B | 1.48 | 5.8 | −0.3 | −1.7 | −1.7 |
| Ex. 10 | B | 1.48 | 3.2 | −0.3 | −0.3 | −0.3 |
| Ex. 13 | B | 1.55 | 3.4 | −0.3 | −0.3 | −0.3 |
| Ex. 14 | B | 1.62 | 3.6 | −0.3 | −0.3 | −0.3 |

As shown in Table 4, in Examples 13 and 14, the heights of the protruding portion were higher and the volumes of the remaining spaces inside the batteries were smaller, compared to Example 10; but results similar to those for Example 10 were obtained from the overdischarge test. In Examples 13 and 14, since the volumes of the remaining spaces in the batteries were small, the internal pressures of the batteries during charge were higher compared to Example 10; however, both of the internal pressures were within a practical range and their values were considerably lower than that in Comparative Example 2 in which the volume of the remaining space was the same as that in Example 10. In Examples 13 and 14, rises in the internal pressures were suppressed despite the small volumes of the remaining spaces in the batteries, presumably because moderate water repellency was imparted to the separator by the composite layer and the gas diffusion rate consequently increased, thereby allowing improved gas absorption at the negative electrode surface.

Example 15

A separator and a nickel-metal hydride storage battery were produced as in Example 10, except that a PP non-woven fabric (thickness: 90 μm) hydrophilized by a sulfuric acid treatment was used instead of the PP non-woven fabric hydrophilized by a plasma treatment.

Comparative Example 4

A separator and a nickel-metal hydride storage battery were produced as in Comparative Example 2, except that a PP non-woven fabric (thickness: 90 μm, degree of sulfonation: 2.3×10$^{-3}$) hydrophilized by a sulfuric acid treatment was used instead of the PP non-woven fabric hydrophilized by a plasma treatment.

On the batteries of Example 15 and Comparative Example 4 also, evaluations of (1) and (2) above were conducted as on the battery of Example 10. The results are shown in Table 5.

TABLE 5

| | Separator | | | Internal pressure of battery (MPa) | Overdischarge test Minimum closed circuit voltage (V) | | |
|---|---|---|---|---|---|---|---|
| | Alloy powder | Hydrophilization | Composite layer | | 16Ω | 12Ω | 8Ω |
| Comp. Ex. 2 | B | Plasma | None | 5.8 | −0.3 | −1.7 | −1.7 |
| Comp. Ex. 4 | B | Sulfuric acid | None | 6.2 | −1.7 | −1.7 | −1.7 |
| Ex. 10 | B | Plasma | Included | 3.2 | −0.3 | −0.3 | −0.3 |
| Ex. 15 | B | Sulfuric acid | Included | 3.2 | −0.3 | −0.3 | −0.3 |

In Comparative Example 4, since the separator was treated with sulfuric acid, its ability to retain the electrolyte was higher compared to that in Comparative Example 2. Therefore, as shown in Table 5, in Comparative Example 4, there was a rise in the internal pressure of the battery during charge, and also, a drop in the minimum closed circuit voltage of the battery X in the overcharge test, not only when the resistance was 12Ω or 8Ω, but also when it was 16Ω. That is, compared to the non-woven fabric treated with plasma, the non-woven fabric treated with sulfuric acid evidently caused an easier rise in the internal pressure of the battery during charge and an easier degradation of the overdischarge characteristics.

In contrast, in Example 15, the non-woven fabric treated with sulfuric acid was used as the separator, but the results of the internal pressure of the battery during charge and the overdischarge test were the same as those obtained for Example 10 in which the non-woven fabric treated with plasma was used. That is, evidently, even when the separator used was the non-woven fabric treated with sulfuric acid that was likely to cause rise in the internal pressure and degradation in the overdischarge characteristics, formation of the composite layer with moderate water repellency, and combination of such composite layer and the negative electrode having the water-repellency layers, allowed suppression of rise in the internal pressure and improvement of the overdischarge characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the present invention.

INDUSTRIAL APPLICABILITY

The nickel-metal hydride storage battery of the present invention is capable of suppressing rise in the internal pressure of the battery, even when the capacity of the battery is increased or when two or more of the batteries are used. Therefore, leakage of the alkaline electrolyte associated with rise in the internal pressure of the battery can be effectively suppressed. Thus, the nickel-metal hydride storage battery of the present invention is suited for use as an alternative to a dry battery, and also as a power source for various devices.

EXPLANATION OF REFERENCE NUMERALS 1 battery case
2 insulation packing
3 lid
4 groove
5 sealing agent
6 outer packaging label
6a surface of outer packaging label disposed on peripheral edge portion of sealing body
7 toroid-shaped insulating member
8 gas release hole
9 valve member
10 positive terminal
10a top surface of protruding portion of positive terminal
11 electrode assembly
12 positive electrode
13 negative electrode
14 separator
15 positive electrode lead
16 insulating member with slit
17 round insulating member
18 sealing body

The invention claimed is:
1. A nickel-metal hydride storage battery comprising:
a positive electrode;
a negative electrode;
a separator interposed between the positive electrode and the negative electrode; and
an alkaline electrolyte,
the negative electrode including:
a negative electrode material mixture layer including powder of a hydrogen storage alloy capable of electrochemically absorbing and releasing hydrogen; and
a water-repellent layer including a first polymer including tetrafluoroethylene as monomer units, formed on a surface of the negative electrode material mixture layer,
the separator including:
a primary layer having a non-woven fabric structure of fibers; and
a composite layer formed on a surface of the primary layer and being in contact with the water-repellent layer,
the composite layer including:
fibers in continuity with the non-woven fabric structure; and
a second polymer including tetrafluoroethylene as monomer units, and
a surface of the composite layer having a contact angle with water of 10 to 80°.

2. The nickel-metal hydride storage battery in accordance with claim 1, wherein a maximum thickness of the composite layer is 1 to 25 μm.

3. The nickel-metal hydride storage battery in accordance with claim 1, wherein the maximum thickness of the composite layer is 2 to 20% of a thickness of the separator in whole.

4. The nickel-metal hydride storage battery in accordance with claim 1, wherein a maximum thickness of the water-repellent layer is 1 to 25 μm.

5. The nickel-metal hydride storage battery in accordance with claim 1,
wherein the water-repellent layer includes particles including the first polymer, the particles having a BET specific surface area of 2.5 to 20 $m^2/g$, a maximum particle size of 25 μm or less, and an average particle size of 0.1 to 15 μm.

6. The nickel-metal hydride storage battery in accordance with claim 1,
wherein the composite layer includes particles including the second polymer, the particles having a BET specific surface area of 2.5 to 20 $m^2/g$, a maximum particle size of 25 μm or less, and an average particle size of 0.1 to 15 μm.

7. The nickel-metal hydride storage battery in accordance with claim 1,
wherein the fibers forming the primary layer and the composite layer include a polyolefin resin,
at least a part of the fibers is sulfonated, and
a degree of sulfonation of the separator is $1.9 \times 10^{-3}$ to $3.6 \times 10^{-3}$.

8. The nickel-metal hydride storage battery in accordance with claim 1,
wherein the hydrogen storage alloy includes an element Ln, Mg, Ni, and Al,
the element Ln is at least one selected from the group consisting of Group 3 elements and Group 4 elements of the Periodic Table,
a molar ratio x of the Mg included in a total of the element Ln and the Mg is $0.01 \leq x \leq 0.5$,
a molar ratio y of the Ni relative to the total of the element Ln and the Mg is $1.6 \leq y \leq 4$, and
a molar ratio α of the Al relative to the total of the element Ln and the Mg is $0.01 \leq \alpha \leq 0.3$.

9. The nickel-metal hydride storage battery in accordance with claim 8,
wherein the hydrogen storage alloy further includes an element M,
a molar ratio z of the element M relative to the total of the element Ln and the Mg is $0.01 \leq z \leq 0.8$, and
the element M is at least one selected from the group consisting of V, Nb, Ta, Cr, Mo, Mn, Fe, Co, Ga, Zn, Sn, In, Cu, Si, P, and B.

10. The nickel-metal hydride storage battery in accordance with claim 9,
wherein the element M includes at least Co, and the molar ratio z of the Co relative to the total of the element Ln and the Mg is $0.25 \leq z \leq 0.75$.

11. The nickel-metal hydride storage battery in accordance with claim 1,
wherein the positive electrode, the negative electrode, the separator, and the alkaline electrolyte are housed in a bottom-closed cylindrical battery case having an opening portion,
the opening portion is sealed with a sealing body,
the sealing body has a positive terminal having a protruding portion in the center, the protruding portion protruding outward and having a top surface,
a peripheral edge portion of the sealing body, a circumferential surface of the battery case, and a peripheral edge portion of a bottom surface of the battery case are covered with an outer packaging label, and
a distance between a surface of the outer packaging label disposed on the peripheral edge portion of the sealing body and the top surface of the protruding portion is 1 to 1.62 mm.

12. The nickel-metal hydride storage battery in accordance with claim 11, the battery formed by housing the positive electrode, the negative electrode, the separator, and the alkaline electrolyte in the battery case; sealing the opening portion with the sealing body; and subsequently reducing a diameter of the battery case by pressing the circumferential surface of the battery case.

13. A battery assembly comprising two or more of the nickel-metal hydride storage batteries in accordance with claim 1, connected in series.

* * * * *